United States Patent
Murakami et al.

(10) Patent No.: US 7,754,813 B2
(45) Date of Patent: Jul. 13, 2010

(54) RESIN MODIFIER AND POLAR GROUP-CONTAINING POLYMER COMPOSITION CONTAINING THE SAME

(75) Inventors: Shuichi Murakami, Sodegaura (JP); Seiji Ota, Ichihara (JP); Junji Tan, Sodegaura (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 601 days.

(21) Appl. No.: 10/594,091

(22) PCT Filed: Mar. 10, 2005

(86) PCT No.: PCT/JP2005/004200

§ 371 (c)(1),
(2), (4) Date: Sep. 25, 2006

(87) PCT Pub. No.: WO2005/097840

PCT Pub. Date: Oct. 20, 2005

(65) Prior Publication Data

US 2007/0173603 A1 Jul. 26, 2007

(30) Foreign Application Priority Data

Mar. 26, 2004 (JP) .............................. 2004-093245

(51) Int. Cl.
*C08F 8/30* (2006.01)
*C08L 101/02* (2006.01)
*C08L 23/00* (2006.01)

(52) U.S. Cl. ...................... 525/191; 525/192; 525/194; 525/326.1; 525/374; 525/416

(58) Field of Classification Search ................. 525/50, 525/63, 66, 69, 78, 79, 191, 192, 194, 326.1, 525/374, 416
See application file for complete search history.

(56) References Cited

U.S. PATENT DOCUMENTS

| | | | | | |
|---|---|---|---|---|---|
| 4,689,372 A | * | 8/1987 | Han et al. | ..................... | 525/390 |
| 4,707,512 A | * | 11/1987 | Maruyama et al. | .......... | 524/504 |
| 5,216,050 A | * | 6/1993 | Sinclair | ...................... | 524/108 |

FOREIGN PATENT DOCUMENTS

| | | |
|---|---|---|
| EP | 0804506 B1 | 12/2001 |
| JP | 60-233131 A | 11/1985 |
| JP | 3-503655 A | 8/1991 |
| JP | 3-263468 A | 11/1991 |
| JP | 5-500980 A | 2/1993 |
| JP | 8-508530 A | 9/1996 |
| JP | 9-194719 A | 7/1997 |
| JP | 9-249717 A | 9/1997 |
| JP | 2003-268215 A | 9/2003 |

OTHER PUBLICATIONS

Machine translation of JP 2003268215.*

* cited by examiner

*Primary Examiner*—Irina S Zemel
*Assistant Examiner*—Jeffrey Lenihan
(74) *Attorney, Agent, or Firm*—Buchanan Ingersoll & Rooney PC

(57) ABSTRACT

A resin modifier (C) obtained by reacting a polyolefin (A) having a group which reacts with a carbodiimide group, and a carbodiimide group-containing compound (B), wherein the content of the carbodiimide group is from 1 to 200 mmol per 100 g of the resin modifier, and a polar group-containing polymer composition (F) comprising from 1 to 30% by weight of the resin modifier (C), from 99 to 20% by weight of a polar group-containing polymer (D), and from 0 to 80% by weight of an olefin polymer (E). The modifier can provide improved low-temperature impact resistance of a polymer alloy including a polar group-containing polymer and an olefin polymer (such as polylactic acid and polypropylene), and can provide a molded article with smooth surface when the polymer alloy is molded. A polar group-containing polymer composition is also set forth.

12 Claims, No Drawings

RESIN MODIFIER AND POLAR GROUP-CONTAINING POLYMER COMPOSITION CONTAINING THE SAME

TECHNICAL FIELD

The present invention relates to a novel resin modifier and a polar group-containing polymer composition containing the same, and in more detail, it relates to a resin modifier which improves a compatibility of dissimilar polymers, and a polar group-containing polymer composition containing the same.

BACKGROUND ART

Conventionally, of thermoplastic resins, a polar group-containing polymer such as a polyester and a polyamide is particularly excellent in mechanical strength, heat resistance, gas barrier properties and the like, and is therefore used as various molded articles such as a container, a palette, a gas tank, a civil engineering material and a precision machine. Further, in recent years, utilization of a recyclable product such as a polyethylene terephthalate, and utilization of an environment adaptive biodegradable resin such as a polylactic acid are advancing. However, as the defect of those polar group-containing polymers, it has been taken that impact resistant strength is poor.

For the purpose of improving impact resistance, a compound comprising a polar group-containing polymer having blended therewith a polycarbodiimide and various elastomers and the like is already known (see Patent Document 1 and Patent Document 2). Patent Document 1 discloses that by using a thermoplastic polyester and a polycarbodiimide as a graft-coupling agent to an amine-functionalized elastomer, a polyester composition having high impact resistance is obtained. Further, Patent Document 2 discloses that a resin composition comprising a thermoplastic resin and a polycarbodiimide is blended with a modified polyolefin or the like, and the resin composition obtained is excellent in impact strength. However, by merely blending a polar group-containing polymer such as a polyester, a polycarbodiimide, and various elastomers, improvement in its impact strength cannot yet be satisfied. In particular, with respect to impact strength at low temperature such as −10° C. or −40° C., further improvement was desired. Further, in the case of conducting molding such as an injection molding from a composition in the case of merely blending, surface of a molded article generates burrs, or is rough, and it was difficult to obtain a smooth surface.

Patent Document 1: JP-T-08-508530 (the term "JP-T" as used herein means a published Japanese translation of a PCT patent application)

Patent Document 2: JP-A-09-194719

DISCLOSURE OF THE INVENTION

Problems that the Invention is to Solve

Objects of the invention are to provide a resin modifier that can improve impact resistance in a polymer alloy by improving compatibility between a polar group-containing polymer and an olefin polymer (E), and can obtain a smooth surface in the case of molding a molded article from a polar group-containing polymer composition, and a polar group-containing polymer composition containing the resin modifier.

Means for Solving the Problems

The present inventors have made keen investigations, have found that a material obtained by reacting a polyolefin and a carbodiimide group-containing compound is useful as a resin modifier, and have completed the invention.

That is, the invention provides a resin modifier (C) obtained by reacting a polyolefin (A) having a group which reacts with a carbodiimide group, and a carbodiimide group-containing compound (B), wherein the content of the carbodiimide group is from 1 to 200 mmol per 100 g of the resin modifier (C).

Further, the invention provides a polar group-containing polymer composition (F) containing the resin modifier (C).

EFFECT OF THE INVENTION

According to the resin modifier (C) of the invention, compatibility between the polar group-containing polymer (D) and the olefin polymer (E) is improved, and in addition, the polar group-containing polymer composition (F) which improves low temperature impact resistance in a polymer alloy (F) can be obtained. Further, because the resin modifier (C) of the invention is a polyolefin containing a carbodiimide group which reacts with the polar group-containing polymer (D), compatibility between the polar group-containing polymer (D) and the olefin polymer (E) is improved, and a surface of an injection-molded article of a polymer alloy does not have burrs or does not become rough.

BEST MODE FOR CARRYING OUT THE INVENTION

The invention is described in more detail below.

The resin modifier (C) of the invention is a resin modifier that improves compatibility between dissimilar polymers, such as between the polar group-containing polymer (D) and the olefin polymer (E), and is also called a compatibilizer.

The resin modifier (C) of the invention is a polymer composition obtained by reacting a polyolefin (A) having a group which reacts with a carbodiimide group, and a carbodiimide group-containing compound (B).

Polyolefin (A) Having Group which Reacts with Carbodiimide Group

The polyolefin (A) having a group which reacts with a carbodiimide group used in the invention can be obtained by introducing a compound (a) having a group which reacts with a carbodiimide group into a polyolefin.

As the compound (a) having a group which reacts with a carbodiimide group, a compound having a group which has active hydrogen having reactivity to a carbodiimide group is exemplified, and specifically, it is a compound having a group derived from a carboxylic acid, an amine, an alcohol, a thiol or the like. Of those, a compound having a group derived from a carboxylic acid is preferably used, and above all, an unsaturated carboxylic acid and/or its derivative are particularly preferable. Further, other than the compound which has a group having active hydrogen, a compound having a group which is easily converted into a group having active hydrogen by water or the like can also preferably be used. Specifically, compounds having an epoxy group or a glycidyl group are exemplified. In the invention, the compound (a) having a group which reacts with a carbodiimide group may be used alone or as mixtures of two or more.

In the invention, in the case of using an unsaturated carboxylic acid and/or its derivative as the compound (a) having a group which reacts with a carbodiimide group, an unsaturated compound having at least one carboxylic group, an unsaturated compound having at least one carboxylic anhydride group, and its derivative can be exemplified. As an unsaturated group of the unsaturated compound, a vinyl group, a vinylene group, an unsaturated cyclic hydrocarbon group and the like can be exemplified. As the specific compounds, unsaturated carboxylic acids such as acrylic acid, methacrylic acid, maleic acid, fumaric acid, tetrahydrophthalic acid, itaconic acid, citraconic acid, crotonic acid, isocrotonic acid, norbornenedicarboxylic acid, bicyclo[2,2,1]hept-2-ene-5,6-dicarboxylic acid, or their acid anhydrides or their derivatives (for example, an acid halide, an amide, an imide, an ester, and the like) are exemplified. As the specific compounds, malenyl chloride, malenyl imide, maleic anhydride, itaconic anhydride, citraconic anhydride, tetrahydrophthalic anhydride, bicyclo[2,2,1]hept-2-ene-5,6-dicarboxylic anhydride, dimethyl maleate, monomethyl maleate, diethyl maleate, diethyl fumarate, dimethyl itaconate, diethyl citraconate, dimethyl tetrahydrophthalate, dimethyl bicyclo[2,2,1]hept-2-ene-5,6-dicarboxylate, hydroxyethyl (meth)acrylate, hydroxypropyl (meth)acrylate, glycidyl (meth)acrylate, aminoethyl methacrylate and aminopropyl methacrylate can be exemplified.

In the case of employing maleic anhydride as the compound (a) having a group which reacts with a carbodiimide group, and introducing into a polypropylene, it is called a maleic acid-modified polypropylene.

In the case of using an unsaturated carboxylic acid and/or its derivative as the compound (a) having a group which reacts with a carbodiimide group, it can be used alone or can be used by combining two or more thereof. Of those, maleic anhydride, (meth)acrylic acid, itaconic anhydride, citraconic anhydride, tetrahydrophthalic anhydride, bicyclo[2,2,1]hept-2-ene-5,6-dicarboxylic anhydride, hydroxyethyl (meth)acrylate, glycidyl methacrylate, and aminopropyl methacrylate are preferable. Further, a dicarboxylic anhydride such as maleic anhydride, itaconic anhydride, citraconic anhydride, tetrahydrophthalic anhydride, and bicyclo[2,2,1]hept-2-ene-5,6-dicarboxylic anhydride are particularly preferable.

As a method of introducing the compound (a) having a group which reacts with a carbodiimide group into the polyolefin, it is possible to employ the conventional methods. For example, a method of graft copolymerizing the compound (a) having a group which reacts with a carbodiimide group on the polyolefin main chain, a method of radical copolymerizing an olefin and the compound (a) having a group which reacts with a carbodiimide group, and the like can be exemplified.

The methods are specifically described below by dividing into the case of graft copolymerizing and the case of radical copolymerizing.

<Graft Copolymerization>

The polyolefin (A) having a group which reacts with a carbodiimide group in the invention can be obtained by graft copolymerizing the compound (a) having a group which reacts with a carbodiimide group on the polyolefin main chain.

(Polyolefin Main Chain)

The polyolefin used as the polyolefin main chain is a polymer comprising, as a main component, an aliphatic α-olefin having from 2 to 20 carbon atoms and/or an aromatic olefin, and is a polymer comprising, as a main component, preferably an α-olefin having from 2 to 10 carbon atoms and/or an aromatic olefin, and more preferably an α-olefin having from 2 to 8 carbon atoms and/or an aromatic olefin. Those olefins may be used alone or as mixtures of two or more thereof. The content of the olefin as a comonomer is generally 50 mol % or lower, preferably 40 mol % or lower, and more preferably 30 mol % or lower. In the invention, a homopolymer or copolymer of ethylene, propylene, 1-butene, 4-methyl-1-pentene, 1-hexene, 1-octene and styrene can be preferably used. Of those, a copolymer of ethylene and an α-olefin having 3 or more carbon atoms is particularly preferable in the point that good impact resistance is obtained.

Density of the polyolefin used in the graft modification is generally from 0.8 to 1.5 g/cm$^3$, preferably from 0.8 to 1.2 g/cm$^3$, and more preferably from 0.8 to 1.1 g/cm$^3$. Melt flow rate (MFR) at 190° C. and 2.16 kg load according to ASTM D1238 is generally from 0.01 to 500 g/10 min, preferably from 0.05 to 200 g/10 min, and more preferably from 0.1 to 100 g/10 min. Where a propylene-based resin is used, MFR is measured under the conditions of 230° C. and 2.16 kg load.

When the density and MFR of the polyolefin are within the ranges, the density and MFR of the graft copolymer after modification are the same degree, making it easy to handle.

Further, the crystallinity of the polyolefin used in the graft modification is generally 70% or lower, preferably 60% or lower, and more preferably 50% or lower. When the crystallinity is within this range, the graft copolymer after modification is excellent in handling properties.

In the case of using a polypropylene as the polyolefin polymer (E), with respect to the polyolefin main chain of the resin modifier (C), not only the copolymer of ethylene and an α-olefin having 3 or more carbon atoms, but a compatibilizer having a propylene skeleton have the effect for improving impact resistance. With respect to the polyolefin main chain of the resin modifier (C) used in such a case, it is preferable that the density of the propylene-based polyolefin is from 0.86 to 1.20 g/cm$^3$, and the crystallinity is generally 50% or higher.

In the case of using a resin having low heat resistance such as a polylactic acid and a polyethylene terephthalate as the polar group-containing polymer (D), in the polar group-containing polymer composition (F) containing a the resin modifier (C) comprising polypropylene or polypropylene skeleton as a resin modifier, and the polypropylene polymer as the olefin polymer (E), there is the case that improvement of impact resistance and heat resistance is seen by the addition of the resin modifier (C).

The number average molecular weight (Mn) of the polyolefin used in the graft modification measured by a gel permeation chromatography (GPC) is generally from 1,000 to 1,000,000, preferably from 5,000 to 500,000, and more preferably from 10,000 to 100,000. When the average molecular weight (Mn) is within this range, handling properties are excellent.

In the ethylene-based polyolefin, the number average molecular weight can be determined in terms of polyethylene conversion in the case that the comonomer amount is 10 mol % or less, and in terms of ethylene propylene conversion (ethylene content 70 mol % being a standard substance) in the case of exceeding 10 mol %.

Further, in the propylene-based polyolefin, the number average molecular weight can be determined in terms of polypropylene conversion in the case that the comonomer amount is 10 mol % or less, and in terms of ethylene propylene conversion (ethylene content 70 mol % being a standard substance) in the case of exceeding 10 mol %.

The above polyolefin can be produced by any conventional methods, and, for example, can be produced by polymerizing using a titanium catalyst, a vanadium catalyst, a metallocene catalyst and the like. Further, the polyolefin used in the graft modification may be any form of a resin and an elastomer, and can use both of an isotactic structure and a syndiotactic structure. There is no any particular limitation on steric regularity. Commercially available resin can be utilized as it is.

(Graft Polymerization Method)

In the case of obtaining the polyolefin (A) having a group which reacts with a carbodiimide group used in the invention by graft copolymerization, a compound having a group which reacts with a carbodiimide group, and if necessary, other ethylenically unsaturated monomer and the like are graft copolymerized on the above polyolefin becoming the graft main chain.

The method of graft polymerizing the compound having a group which reacts with a carbodiimide group on the polyolefin main chain is not particularly limited, and the conventional graft polymerization method such as a solution method and a melt kneading method can be employed.

<Radical Copolymerization>

The polyolefin (A) having a group which reacts with a carbodiimide group in the invention can also be obtained by radical copolymerizing an olefin and the compound (a) having a group which reacts with a carbodiimide group. As the olefin, it is possible to employ the same olefin as in the case of forming the above polyolefin becoming the graft main chain, and further, the compound (a) having a group which reacts with a carbodiimide group is the same as described above.

The method of copolymerizing the olefin and the compound having a group which reacts with a carbodiimide group is not particularly limited, and the conventional radical copolymerization method can be employed.

(Polyolefin (A) Having a Group which Reacts with a Carbodiimide Group)

The content of the compound (a) having a group which reacts with a carbodiimide group in the polyolefin (A) having a group which reacts with a carbodiimide group, used in the invention is generally from 0.1 to 10% by weight, preferably from 0.1 to 3.0% by weight, and more preferably from 0.1 to 1.0% by weight. Where the content of the compound (a) having a group which reacts with a carbodiimide group exceeds the above range, there is the case that it crosslinks with the carbodiimide group-containing compound (B), making it difficult to produce the resin modifier (C).

In producing the resin modifier (C) of the invention, there is the case that crosslinking is liable to occur at the time of production, torque rises, and it is difficult to produce the resin modifier (C). The crosslinking tends to occur in the case that the content of the compound (a) having a group which reacts with a carbodiimide group in the polyolefin (A) having a group which reacts with a carbodiimide group is large. The reason for this is that the copolymerized part of the compound (a) having a group which reacts with a carbodiimide group reacts with the carbodiimide compound (B), so that the existence proportion of the crosslinked portion becomes large.

On the other hand, in the invention, where the content of the compound (a) having a group which reacts with a carbodiimide group in the polyolefin (A) having a group which reacts with a carbodiimide group is small, the production of the resin modifier (C) is possible, but the bonding portion between the carbodiimide group-containing compound (B) becoming the skeleton of the resin modifier (C) and the polyolefin (A) decreases. As a result, a low temperature impact resistance-improving effect in the case of forming the polar group-containing polymer composition (F) becomes small.

There is the tendency that the crosslinking is difficult to occur as decreasing the number average molecular weight of the polyolefin (A) having a group which reacts with a carbodiimide group, and further, as decreasing the molar ratio of (mole number of compound (a) having a group which reacts with a carbodiimide group)/(mole number of molecular chain of polyolefin copolymer (A)). That is, this means that in the case that the compound (a) having a group which reacts with a carbodiimide group is present on the molecular chain of the polyolefin (A) having a group which reacts with a carbodiimide group in the state of near singular number, not plural number, when carbodiimide (N=C=N) group of the carbodiimide group-containing compound (B) reacts with the compound (a) having a group which reacts with a carbodiimide group, those can be bonded without surrounding a ring by crosslinking.

Further, in the invention, by controlling the number average molecular weight (Mn) of the polyolefin (A) having a group which reacts with a carbodiimide group and the content of the compound (a) having a group which reacts with a carbodiimide group, crosslinking does not occur in the production of the resin modifier (C), and further, a sufficient low temperature impact resistance-improving effect in the case of forming the polar group-containing polymer composition (F) using the resin modifier (C) can be obtained. That is, in the invention, it is preferable that the polyolefin (A) having a group which reacts with a carbodiimide group is satisfied with the following formula (1), $$0.1 < Mn/(100*f/M) < 6 \quad (1)$$

wherein f is the molecular weight (g/mol) of the compound (a) having a group which reacts with a carbodiimide group, M is a content (wt %) of residue of the compound (a) having a group which reacts with a carbodiimide group, and Mn is a number average molecular weight of the polyolefin (A).

Further, in order to stably produce the resin modifier (C) without occurrence of the crosslinking, it is preferable to satisfy the formula (2), and it is most preferable to satisfy the formula (3).

$$0.3 < Mn/(100*f/M) < 5 \quad (2)$$

$$0.5 < Mn/(100*f/M) < 4 \quad (3)$$

When the relationship between the number average molecular weight (Mn) of the polyolefin (A) having a group which reacts with a carbodiimide group and the amount of the compound (a) having a group which reacts with a carbodiimide group is within the above range, in producing the resin modifier (C), it can be stably produced without conducting the crosslinking.

Further, in the invention, in the case of obtaining the polyolefin (A) having a group which reacts with a carbodiimide group by graft polymerizing, where the polyolefin becoming the graft main chain is a rigid and crosslinkable ethylene resin such as a linear low density polyethylene, there is the tendency to be liable to crosslink as compared with a flexible resin such as an ethylene-butene copolymer. For this reason, in the case of using a rigid resin as the graft main chain, it is possible to control the crosslinking with the compound having a group which reacts with a carbodiimide group being present on the molecular chain of the polyolefin (A) in the number near the singular number, that is, with decreasing the numeral of the above calculation formula.

Further, in the case that the polyolefin becoming the graft main chain is a resin which decreases its molecular weight by thermal decomposition, such as a polypropylene, the phenomenon of increasing viscosity by crosslinking is difficult to occur. For this reason, in the case of using a resin which is liable to thermally decompose as the graft main chain, there is the case that the resin modifier (C) can be produced without increasing viscosity even in that case that the compound having a group which reacts with a carbodiimide group is present on the molecular chain of the polyolefin (A) in plural number, that is, the numeral in the above calculation formula is a high value such 3 or higher. Where viscosity increases, in a flowability measurement of 190° C. MFR, the value of MFR is 0 g/10 min, thus losing the flowability.

In the polyolefin (A) produced by a radical copolymerization, the number average molecular weight can be determined by the usual molecular weight measurement method of a polymer, such as GPC method, light scattering method, low angle light scattering photometry, vapor pressure osmometry, and membrane osmometry.

The melt flow rate (MFR) at 2.16 kg load and 190° C. according to ASTM D1238 of the polyolefin (A) having a group which reacts with a carbodiimide group used in the invention is generally from 0 to 100 g/10 min, and preferably from 0 to 10 g/10 min. The resin modifier (C) using the polyolefin (A) of the above range is excellent in an impact resistance-improving effect.

Further, the density of the polyolefin (A) having a group which reacts with a carbodiimide group is generally from 0.8 to 2.0 g/cm$^3$, preferably from 0.8 to 1.5 g/cm$^3$, and more preferably from 0.8 to 1.2 g/cm$^3$.

In the case that the polyolefin (A) having a group which reacts with a carbodiimide group has a rubber elasticity such as a glass transition temperature of −10° C. or lower, there is the tendency that the impact resistance-improving effect is large.

Further, in the case that the polyolefin (A) having a group which reacts with a carbodiimide group has a rubber elasticity such as a glass transition temperature of −10° C. or lower, there is the case to slightly decrease heat resistance such as a heat distortion temperature due to a load of the polar group-containing polymer composition (A). In such a case, the heat resistance can be prevented from lowering by making the polyolefin (A) having a group which reacts with a carbodiimide group be a high density product.

Carbodiimide Group-Containing Compound (B)

The carbodiimide group-containing compound (B) used in the invention is a polycarbodiimide having a repeating unit represented by the following general formula [1],

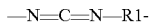  [1]

wherein R1 represents a divalent organic group).

Synthesis method of the polycarbodiimide is not particularly limited, but for example, the polycarbodiimide can be synthesized by reacting an organic polyisocyanate in the presence of a catalyst which promotes polycarbodiimidation reaction of an isocyanate group.

A polystyrene convention number average molecular weight (Mn) determined by a gel permeation chromatography (GPC) of the carbodiimide group-containing compound (B) used in the invention is generally from 400 to 500,000, preferably from 1,000 to 10,000, and more preferably from 2,000 to 4,000. When the number average molecular weight (Mn) is within this range, the polar group-containing polymer composition (F) is excellent in the impact resistance-improving effect, which is preferable.

The carbodiimide group-containing compound (B) used in the invention may contain monocarbodiimide in the polycarbodiimide, and it is possible to use a single compound or by mixing plural compounds.

The commercially available carbodiimide compound can be used as it is. As the commercially available carbodiimide compound, Carbodilight HMV-8CA or LA1, a product of Nissinbo Industries, Inc., is exemplified.

The carbodiimide group content in the carbodiimide group-containing compound (B) and the resin modifier (C) obtained can be measured by C-NMR, IR, titration method or the like, and it is possible to grasp as a carbodiimide equivalent. Peak is observed at 130 to 142 ppm in C-NMR, and 2130 to 2140 cm$^{-1}$ in IR, and it is possible to measure the content of carbodiimide group by this peak.

Resin Modifier (C)

(Preparation Method of Resin Modifier)

The resin modifier (C) of the invention can be obtained by reacting the polyolefin (A) having a group which reacts with a carbodiimide group and the carbodiimide group-containing compound (B). Specifically, the resin modifier (C) can be obtained by melt kneading such as melt modification, but it is not limited to this method.

Example in the case of melt modifying is shown below. Kneading method in the case of melt kneading the polyolefin (A) having a group which reacts with a carbodiimide group and the carbodiimide group-containing compound (B) is not particularly limited. It is obtained by simultaneously or successively charging the polyolefin (A) having a group which reacts with a carbodiimide group and the carbodiimide group-containing compound (B) in, for example, a Henschel mixer, a V blender, a tumbler blender, a ribbon blender or the like, followed by kneading, and then melt kneading with a single screw extruder, a multiple screw extruder, a kneader, a Banbury mixer or the like. Of those, where an apparatus having excellent kneading performance, such as a multiple screw extruder, a kneader or a Banbury mixer, is used, it is preferable in that a polymer composition in which each component has been more uniformly dispersed and reacted can be obtained.

A method for supplying the polyolefin (A) having a group which reacts with a carbodiimide group and the carbodiimide group-containing compound (B) can adopt any methods of a method of previously mixing and then supplying from a hopper, and a method of supplying a part of components from a hopper, and supplying other components from a supply port arranged at an optional portion between the vicinity of the hopper portion and the top of an extruder.

Temperature in melt kneading the above each component is a temperature of the highest melting point or higher in the melting point of each component mixed. Specifically, melt kneading is conducted in a range of generally from 120 to 300° C., preferably from 180 to 280° C., and more preferably from 250 to 270° C.

The resin modifier (C) of the invention is excellent in flowability and excellent in compatibility to the polar group-containing polymer (D). The melt flow rate (MFR) at 190° C. and 2.16 Kg load of the resin modifier (C) of the invention is generally from 0 to 20 g/10 min, preferably from 0 to 10 g/10 min, and more preferably from 0 to 5 g/10 min. Where the polyolefin (A) having a group which reacts with a carbodiimide group is a polypropylene-based resin, MFR is measured under the conditions of 230° C. and 2.16 kg load. The melt flow rate (MFR) is generally from 0 to 20 g/10 min, preferably from 0 to 10 g/10 min, and more preferably from 0 to 5 g/10 min.

When the MFR is within this range, the polar group-containing polymer composition (F) is excellent in the impact resistance-improving effect.

The degree of progress of the reaction between a group which reacts with a carbodiimide group in the polyolefin (A) and a carbodiimide group in the carbodiimide group-containing compound (B), in the resin modifier (C) of the invention can be measured by the following method.

Each hot press sheet of the polyolefin (A) having a group which reacts with a carbodiimide group of the present invention, and the resin modifier (C) of the invention obtained by reacting the polyolefin (A) and the carbodiimide group-containing compound (B), is prepared, and thereafter, an infrared absorption spectrum is measured using an infrared spectrophotometer. From the spectrum obtained, an absorbance in absorption band (in the case of using maleic anhydride, 1790 cm$^{-1}$) derived from the group which reacts with a carbodiimide group in said polyolefin (A) and the compound (a) having a group which reacts with a carbodiimide group in the resin modifier (C) of the invention is measured. Absorbances before and after the reaction of said polyolefin (A) with the carbodiimide group-containing compound (B) are compared, and reaction rate can be calculated using the following equation, Reaction rate (%)=$X_2/X_1 \times 100$ wherein $X_1$ is the intensity of absorption band derived from the group which reacts with a carbodiimide group of polyolefin (A) before reaction, and $X_2$ is difference in intensity of absorption band derived from the groups which react with a carbodiimide group in the polyolefin (A) before the reaction and in the resin modifier (C) after the reaction.

The reaction rate obtained by the above method with respect to the resin modifier (C) of the invention is in a range of generally from 40 to 100%, preferably from 50 to 100%, and more preferably from 90 to 100%.

In producing the resin modifier (C) of the invention, the blending amount of the carbodiimide group-containing compound (B) is an amount such that the content of the carbodiimide group is generally from 1 to 200 mmol, preferably from 10 to 150 mmol, and more preferably from 30 to 100 mmol, per 100 g of the resin modifier (C) obtained by reacting the polyolefin (A) having a group which reacts with a carbodiimide group and the carbodiimide group-containing compound (B). Where the carbodiimide group content is too small, the function as the resin modifier (C) cannot be exhibited, and in the case of forming the polar group-containing polymer composition (F), the low temperature impact resistance-improving effect is not obtained. On the other hand, where the carbodiimide group content is large, the low temperature impact resistance-improving effect is improved, but the overall impact resistance-improving effect is not so improved, which is not economical. When the carbodiimide group content is within the above range, the balance between the low temperature impact resistance-improving effect and the impact resistance-improving effect is excellent.

In a maleic acid-modified polypropylene (hereinafter referred to as "M-PP"), where the addition amount of maleic acid is 1.1% by weight, it is desirable that the amount of unreacted maleic acid residue in the resin modifier (C) after reaction with a carbodiimide group is generally 0.1% by weight or more, preferably from 0.1 to 1.0% by weight, and more preferably from 0.2 to 0.8% by weight.

In the case that "M-PP" has a number average molecular weight of 30,000, and the addition amount of maleic acid is 1.1% by weight, it means that three maleic acids are bonded to one polypropylene molecular chain. In the case that after reacting with the carbodiimide group-containing compound (B), one of three bonded to the polypropylene molecular chain disappears, the propylene molecule and the carbodiimide group-containing compound (B) become the same molecular chain. In other words, in the case that the charged amount of maleic acid is 1.1% by weight, the carbodiimide group and maleic acid react in 33%. Where it is a system not diluted with an unmodified propylene polymer, it is desirable that unreacted maleic acid is in the vicinity of from 0.6 to 0.8% by weight. In the case of adding unmodified polyolefin at the time of reaction to dilute, and reacting, the resin modifier concentration decreases, so that there is the tendency that ability as the resin modifier decreases.

The resin modifier (C) of the invention has a main chain skeleton of a polyolefin polymer while having reactivity of a carbodiimide group present in the resin modifier with active hydrogen of carboxylic acid, an amine, an alcohol, thiol or the like. Therefore, the resin modifier (C) is useful as a reactive compatibilizer between the polar group-containing polymer (D) having active hydrogen and the polyolefin polymer (E), and can improve impact resistance of a polymer alloy.

In the case that a carbodiimide group present in the resin modifier reacts with carboxylic acid group of a polyester, the resin modifier (C) of the invention becomes a reactive compatibilizer between the polar group-containing polymer (D) which is a polyester and the polyolefin polymer (E). In this case, an amide bond generates by a carbodiimide group and carboxylic acid.

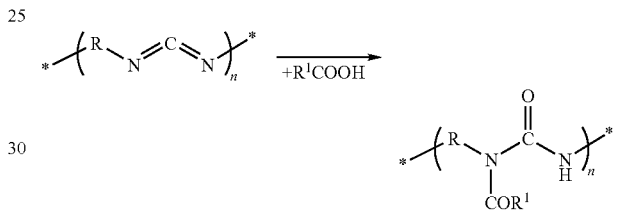

The resin modifier (C) has a polyolefin polymer having a polyolefin skeleton having a number average molecular weight of from 1,000 to 1,000,000, and having a carbodiimide group and an amide bond. This amide bond can be identified by an absorption zone (in the vicinity of 1650 cm$^{-1}$) by infrared absorption analysis.

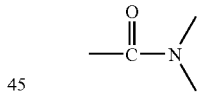

Further, in the invention, in the case that the content of carbodiimide group is excess to the compound (a) having a group which reacts with a carbodiimide group, the resin modifier (C) contains unreacted, free carbodiimide group-containing compound (B). This may make the polar group-containing polymer (D) of the polar group-containing polymer composition (F) crosslink, resulting in phase reversal of a sea-island phase of the polar group-containing polymer (D) and the polyolefin polymer (E).

Polar Group-Containing Polymer (D)

The polar group-containing polymer (D) used in the invention is a polymer having active hydrogen which has reactivity to a carbodiimide group present in the resin modifier (C), and is a polymer having a group derived from carboxylic acid, an amine, an alcohol, a thiol or the like. Specifically, a polyester, a polyamide, a polylactic acid, a polycarbonate, an acrylic resin, a polyphenylene oxide, a polyether sulfone (PES), an acrylonitrile-butadiene-styrene copolymer (ABS), an ethylene-vinyl alcohol copolymer, a polyether such as polyacetal, and the like are exemplified. The polar group-containing polymer (D) used in the invention may be used alone or as mixtures of two or more thereof. In the invention, of those, a polyester, a polyamide and an ethylene-vinyl alcohol copolymer are preferably used.

As the polyester, an aromatic polyester such as a polyethylene terephthalate, a waste polyethylene terephthalate for recycling, a polyethylene naphthalate and a polybutylene terephthalate; a lactic acid resin such as a polycaprolactone, a polyhydroxybutyrate and a polylactic acid; a polyhydroxyalkanoate (PHA); a polybutylene succinate (PBS); a biodegradable polyester resin; and the like can be exemplified. Further, an ethylene-unsaturated carboxylic acid copolymer or its ionomer may be contained in the polyester.

As the polyamide, an aliphatic polyamide such as nylon-6, nylon-66, nylon-10, nylon 12, and nylon 46; an aromatic polyamide produced from an aromatic dicarboxylic acid and an aliphatic diamine; and the like can be exemplified. Of those, nylon-6 is preferable.

As the ethylene-vinyl alcohol copolymer, copolymers containing from 20 to 50 mol %, and preferably from 25 to 48 mol %, of a polymer unit derived from ethylene are desirable. Those can be produced by saponifying an ethylene-vinyl acetate copolymer by the ordinary method.

As the polyacetal, a polyformaldehyde (polyoxymethylene), a polyacetaldehyde, a polypropionaldehyde, a polybutylaldehyde and the like can be exemplified, and a polyformaldehyde is particularly preferable.

As the polar group-containing polymer (D) used in the invention, a polyethylene terephthalate can particularly preferably be used. Further, a waste polyester for recycling which is expected in environmental responsiveness, or a lactic acid-based resin which is a biodegradable polyester can also suitably be used. The waste polyester for recycling which is expected in environmental responsiveness, and the biodegradable polyester are described below.

(Waste Polyester for Recycling)

As the waste polyester for recycling, a waste polyethylene terephthalate for recycling, a regenerated polyethylene terephthalate resin, and the like can be exemplified, and it is a granular or powdery polyester obtained by recovering a used polyester container, removing foreign materials, cleaning, and drying. In the case of using a recycled polyester as the polar group-containing polymer (D) in the invention, it can be used alone or as blends with a virgin polyester. In the case that an inherent viscosity of the recycled polyester is decreased, it is possible to use by blending with a virgin polyester, and in this case, it is preferable that the blending ratio of recycled polyester:virgin polyester is in a weight ratio of from 50:50 to 80:20. As the recycled polyester, there is, for example, Regenerated PET Flake (a trade name, produced by Yono PET Bottle Recycle Co.

(Biodegradable Polyester)

The biodegradable polyester that can be used as the polar group-containing polymer (D) of the invention includes aliphatic polyesters having biodegradability that can be produced by variously combining an aliphatic hydroxycarboxylic acid, an aliphatic dihydric alcohol, an aliphatic dibasic acid, and an aromatic dibasic acid; and aromatic polyesters to which biodegradability is imparted by copolymerizing a component such as an aliphatic polyvalent carboxylic acid or an aliphatic polyhydric alcohol with an aromatic polyester. As the aliphatic polyesters having biodegradability, a polylactic acid, a polyethylene succinate, a polybutylene succinate, a polybutylene succinate adipate, a polyhydroxyalkanoate, a polyhydroxybutyric acid, a polyhydroxyvaleic acid, a copolymer of β-hydroxybutyric acid and β-hydroxyvaleic acid, a polycaprolactone and the like can be exemplified. As the aromatic polyesters, a modified PET or modified PBT based on a polyethylene terephthalate (PET) or a polyethylene butyrate (PBT), and the like can be exemplified.

In particular, a polybutylene succinate, a polybutylene succinate adipate (trade name: BIONOLLE, a product of Showa Highpolymer Co.), a polycaprolactone (trade name: PLAXEL, a product of Daicel Chemical Industries, LTD), a modified PET (trade name: BIOMAX, a product of Du Pont), and a modified PBT (trade name: ECOFLEX, a product of BASF) are preferable from the point of being easily and inexpensively available. Further, a polylactic acid (trade name: LACEA, a product of Mitsui Chemicals, Inc.) is available as a commercially available resin.

Further, those polyesters may be ones in which a polymer chain is extended by a binder such as diisocyanate, and ones that are copolymerized by the co-presence of a small amount of an aliphatic polyhydric alcohol such as trimethylolpropane and glycerin, an aliphatic polybasic acid such as butanetetracarboxylic acid, or polyhydric alcohols such as polysaccharide.

Further, the polar group-containing polymer (D) in the invention may be used alone or as mixtures of two or more of polymers.

Olefin Polymer (E)

The olefin polymer (E) used in the invention is a polymer comprising α-olefin having from 2 to 20 carbon atoms as the main component, and is a polymer comprising α-olefin having preferably from 2 to 10 carbon atoms, and more preferably from 2 to 8 carbon atoms, as the main component. It is sufficient as long as α-olefin is the main component, and copolymers with other monomer other than olefin can be used, and other monomer component is not particularly limited.

Those α-olefins may be used alone or as mixtures of two or more thereof, and the content of α-olefin as a comonomer is generally 50 mol % or less, preferably 40 mol % or less, and more preferably 30 mol % or less. In the invention, homopolymers or copolymers of ethylene, propylene, 1-butene, 4-methyl-1-pentene, 1-hexene and 1-octene can preferably be used. Of those, ethylene-based polymers are preferable from the point that good impact resistance is obtained, and copolymers of ethylene with α-olefin having 3 or more carbon atoms are particularly preferable. Further, the olefin polymer (E) in the invention may be used alone or as mixtures of two or more.

The olefin polymer (E) in the invention can be suitably used in either form of a resin and an elastomer. Further, the olefin polymer (E) can be produced by the conventionally known methods, and for example, it can be produced by conducting polymerization using a titanium catalyst, a vanadium catalyst, a metallocene catalyst or the like. Both of one having an isotactic structure and one having a syndiotactic structure can be used, and there is no particular limitation on stereo-tacticity. It is possible to utilize the commercially available resins as they are.

As specific examples of the olefin polymer (E) in the invention, olefin homopolymers such as a polyethylene, a polypropylene, a poly-1-butene, a polymethylpentene, and a polymethylbutene; and olefin copolymers such as an ethylene-α-olefin random copolymer, an ethylene-propylene-diene terpolymer, a propylene-ethylene random copolymer, a propylene-α-olefin random copolymer, and a propylene-ethylene-α-olefin terpolymer can be exemplified. Of those, a polyethylene, a polypropylene, an ethylene-1-butene random copolymer, an ethylene-α-olefin random copolymer, an ethylene-propylene-diene terpolymer, a propylene-ethylene random copolymer, and a propylene-α-olefin random copolymer are preferable.

In the case of employing an elastomer having elasticity as the olefin polymer (E), an impact resistance-improving effect in a polymer alloy of the polar group-containing polymer (D) and the olefin polymer (E) is large, and in particular, low temperature impact resistance can greatly be improved.

The ethylene polymer that can be used as one example of the olefin polymer (E) is described below. In the case of using the ethylene-based polymer as the olefin polymer (E), the ethylene content is generally from 50 to 98 mol %, preferably from 50 to 97 mol %, and more preferably from 55 to 95 mol %. When the ethylene content is within this range, the polar group-containing polymer composition (F) is excellent in an impact resistance-improving effect.

Further, the density of the ethylene polymer is generally from 0.860 to 0.920 g/cm$^3$, preferably from 0.860 to 0.910 g/cm$^3$, and more preferably from 0.860 to 0.900 g/cm$^3$. Melt flow rate (MFR) measured at 190° C. and 2.16 kg load according to ASTM D1238 is generally from 0.01 to 500 g/10 min, preferably from 0.05 to 200 g/10 min, and more preferably from 0.1 to 100 g/10 min. When the density and MFR are within those ranges, the polar group-containing polymer composition (F) is excellent in an impact resistance-improving effect.

Crystallinity of the ethylene-based polymer that can be used in the invention is generally 50% or lower, preferably 30% or lower, and more preferably 20% or lower. When the crystallinity is within this range, the polar group-containing polymer composition (F) is excellent in an impact resistance-improving effect.

Further, number average molecular weight (Mn) measured by a gel permeation chromatography (GPC) of the ethylene polymer is generally from 5,000 to 1,000,000, preferably from 8,000 to 500,000, and more preferably from 10,000 to 200,000, in terms of an ethylene-propylene copolymer (ethylene: 70 mol %) conversion. A molecular weight distribution (Mw/Mn) is generally 20 or less, preferably 10 or less, and more preferably 3 or less. In the ethylene-based polyolefin, the number average molecular weight can be obtained in terms of polyethylene conversion when a comonomer amount is 10 mol % or less, and in terms of ethylene propylene conversion (ethylene content 70 mol % is the standard) when it exceeds 10 mol %.

When a modified polypropylene is used as the polyolefin (A) having a group which reacts with a carbodiimide group, a polyethylene terephthalate or a polylactic acid, having low heat resistance is used as the polar group-containing polymer (D), and a polypropylene is used as the polyolefin polymer (E), not only impact resistance-improving effect of the polar group-containing polymer composition (F) based on the resin modifier (C), but heat resistance, can be improved.

A highly crystallized polypropylene obtained by polymerizing 3-methylbutane-1 or the like, and using this as a crystallization nucleating agent has higher heat resistance than the general polypropylene homopolymer, and therefore, such a polypropylene is preferable as the olefin polymer (E).

Besides, a highly stereo-tactic polypropylene, a high molecular weight polypropylene, and polypropylenes containing various crystallization nucleating agent become similarly a high heat resistant polypropylene, and are therefore preferable as the polyolefin polymer (E).

The propylene-based polymer that can be used as one example of the olefin polymer (E) is described below. In the case of using the propylene-based polymer as the olefin polymer (E), the propylene content is generally 60 mol % or more, preferably from 70 to 100 mol %, and more preferably from 80 to 100 mol %. When the propylene content is within this range, the polar group-containing polymer composition (F) is excellent in impact resistance-improving and heat resistance-improving effects.

Further, density of the propylene-based polymer is generally from 0.860 to 0.920 g/cm$^3$, preferably from 0.890 to 0.910 g/cm$^3$, and more preferably from 0.895 to 0.910 g/cm$^3$. Melt flow rate (MFR) measured at 230° C. and 2.16 kg load according to ASTM D1238 is generally from 0.01 to 500 g/10 min, preferably from 0.05 to 200 g/10 min, and more preferably from 0.4 to 100 g/10 min. When the density and MFR are within those ranges, the polar group-containing polymer composition (F) is excellent in an impact resistance-improving effect and a heat resistance-improving effect.

Crystallinity of the propylene-based polymer that can be used in the invention is generally 50% or more, preferably 60% or more, and more preferably 70% or more. When the crystallinity is within this range, the polar group-containing polymer composition (F) is excellent in impact resistance-improving and heat resistance-improving effects.

Further, a number average molecular weight (Mn) measured by a gel permeation chromatography (GPC) of the propylene-based polymer is generally from 5,000 to 1,000,000, preferably from 8,000 to 500,000, and more preferably from 10,000 to 200,000, in terms of a propylene conversion. A molecular weight distribution (Mw/Mn) is generally 20 or less, preferably 10 or less, and more preferably 3 or less.

The olefin polymer (E) of the invention can blend other resins or polymers that can be mixed, in a range that does not impair the object of the invention.

As the other resins or polymers to be blended, an unmodified polyolefin, a vinyl resin, a polystyrene, a polyamide, an acrylic resin, a polyphenylene sulfide resin, a polyether ether ketone resin, a polyester, a polysulfone, a polyphenylene oxide, a polyimide, a polyether imide, an acrylonitrile-butadiene-styrene copolymer (ABS), an ethylene-α-olefin copolymer rubber, a conjugated diene rubber, a styrene rubber, a phenolic resin, a melamine resin, a polyester resin, a silicone resin, an epoxy resin and the like are exemplified. Those resins can be contained alone or as mixtures of two or more. A styrene rubber is preferable, and is specifically a styrene-butadiene-styrene rubber (SBS rubber), a styrene-butadiene-butylene-styrene series SBBS rubber, a styrene-ethylene-butylene-styrene series SEBS rubber, and a maleation-modified SEBS, a maleation-modified SBBS, and imino-modified SEBS and an imino-modified SBBS, that are modified with an acid, a base and the like. Imino-modified products of a styrene-ethylene-butylene-styrene rubber (SEBS rubber) and a styrene-butadiene-butylene-styrene rubber (SBBS rubber) are more preferable.

Further, the polar group-containing polymer composition (F) of the invention can contain conventional softener, tackifier, anti-aging agent, processing assistant, adhesion improver, inorganic filler, inorganic fiber such as glass fiber, organic fiber such as acrylic fiber, PET fiber, PEN fiber, kenaf or plant fiber, organic filler, heat stabilizer, weathering stabilizer, antistatic-agent, colorant, lubricant, flame retardant, blooming inhibitor and the like, in a range that does not impair the object of the invention.

Further, the polyolefin polymer (E) of the invention can contain conventional process stabilizer, heat stabilizer, anti-thermal aging agent, inorganic fiber such as glass fiber, organic fiber such as acrylic fiber, PET fiber, PEN fiber, kenaf or plant fiber, filler, and the like, in a range that does not impair the object of the invention.

Polar Group-Containing Polymer Composition (F)

The polar group-containing polymer composition (F) of the invention is a composition containing the resin modifier (C) in an amount of generally from 1 to 30% by weight, preferably from 2 to 30% by weight, and more preferably from 3 to 25% by weight, the polar group-containing polymer (D) in an amount of from 99 to 20% by weight, preferably from 80 to 25% by weight, and more preferably from 70 to 30% by weight, and the polyolefin polymer (E) in an amount of from 0 to 80% by weight, preferably from 5 to 60% by weight, and more preferably from 10 to 50% by weight, provided that the sum of (C), (D) and (E) is 100% by weight.

(Production Method of Polar Group-Containing Polymer Composition (F))

The production method of the polar group-containing polymer composition (F) of the invention is not particularly limited, and can employ the known methods. For example, a method of melt kneading the resin modifier (C), the polar group-containing polymer (D), the polyolefin polymer (E), and if necessary, blendable resins and additives, en bloc or successively is exemplified. As the melt kneading method, for example, a method of dry blending each component of the resin composition (F), and melt kneading with a single screw or twin screw extruder, a Banbury mixer, a tumbler, a Henschel mixer, a roll, various kneaders, and the like is exemplified. Industrially, an extruder is preferably used. The melt kneading temperature is not particularly limited as long as the resin modifier (C), the polar group-containing polymer (D), and the polyolefin polymer (E) melt. However, it is general to conduct in a temperature range of generally from 180 to 400° C., and preferably from 200 to 280° C.

(Molding Method of Polar Group-Containing Polymer Composition (F))

The molding method of the polar group-containing polymer composition (F) can use the conventionally used methods. For example, it can be molded using the following method.

(1) In extrusion molding, the composition according to the invention is molded with a usual T die extrusion molding machine. By this method, a film or a sheet can be formed.

(2) In injection molding, pellets of the composition according to the invention are melt-softened, charged in a mold, and molded in a molding cycle of from 20 to 90 seconds.

(3) Blow molding (injection blow molding, stretching blow molding or direct blow molding)

For example, in the injection blow molding, pellets of the composition according to the invention are melted with usual injection blow molding machine, and charged in a mold to obtain a preform. The preform obtained is again heated in an oven (heating furnace), and placed in a mold maintaining a constant temperature, and pressurized air is introduced to perform blowing, thereby a blow bottle can be formed.

(4) Vacuum molding/vacuum pressure molding

The film or sheet molded by the same method as the extrusion molding of the above (1) is used as a preform. The preform obtained is heated to once soften, and is subjected to vacuum molding or vacuum pressure molding in a mold maintaining a constant temperature using the usual vacuum molding machine, thereby forming a molded article.

(5) In laminate molding, a laminate molded article can be obtained by a method of laminating the film or sheet obtained by the above extrusion molding method (1) with other substrate by an adhesive or heat, an extrusion lamination method of directly extruding a molten resin from T die on a substrate such as papers, metals or plastics by the same method as the above extrusion molding method (1), a co-extrusion method of melting each of the resin composition of the invention and the like with a separate extruder, respectively, flowing together at die heads, and simultaneously extruding, a co-extrusion lamination method combining those, and the like.

(6) In tape yarn molding, the film or sheet molded by the same method as the above extrusion molding (1) is slit into a specific width, and in the case of a polylactic acid resin, uniaxially heat stretched in a temperature range of from 60 to 140° C., and as the case may be, further heat set in a temperature range of from 80 to 160° C., thereby a molded article can be formed.

(7) In yarn molding, in the case of a polylactic acid resin, a yarn can be obtained by a melt spinning method of melting at a temperature of from 150 to 240° C. using an extruder, and discharging from a spinning nozzle. If desired, a yarn can be formed by uniaxially heat stretching in a temperature range of from 60 to 100° C., and as the case may be, further heat set in a temperature range of from 80 to 140° C.

(8) In non-woven molding, a molded article can be formed by a span bond method or a melt blown method. In the span bond method, a non-woven fabric can be obtained by melt spinning through porous spinning nozzles in the same manner as in the above yarn molding (7), stretching using an air sucker arranged at the lower part of the spinning nozzle to form a web, accumulating on a trapping face, contact bonding this by an emboss roll and a smoothing roll, and heat welding. In the melt blown method, a non-woven fabric can be obtained by that a molten resin discharged through porous spinning nozzles is contacted with a high speed heated gas blown from a heated gas outlet to form fine fibers, and accumulating on a moving support.

(Properties of Injection Molded Article of Polar Group-Containing Polymer Composition (F))

In the resin composition containing from 1 to 30% by weight of the resin modifier (C), from 99 to 20% by weight of the polar group-containing polymer (D), and from 0 to 80% by weight of the olefin polymer (E), morphology is a sea-island structure. The island phase has a diameter of generally from 0.1 to 50 μm, preferably from 0.1 to 30 μm, and more preferably from 0.1 to 20 μm.

By adding the resin modifier (C), the compatibility between the polar group-containing polymer (D) and the olefin polymer (E) increases, and dispersibility of the island phase in the polar group-containing polymer composition (F) improves, thereby impact resistance, tensile elongation and the like are improved.

In particular, in the case of obtaining the polar group-containing polymer (D)/olefin polymer (E), having improved heat resistance, it is preferable to use at least one polyolefin (Mw: 5,000 to 1,000,000) having high crystallization rate selected from a polystyrene, an isotactic polypropylene, an isotactic block polypropylene, and the like as the olefin polymer (E), and a polylactic acid (Mw: 2,000 to 1,000,000) as the aliphatic polyester resin.

As the olefin polymer (E), the intrinsic viscosity ([η]) measured at 135° C. in decalin is from 0.01 to 15 dl/g, and preferably from 0.1 to 10 dl/g. The kind of the olefin polymer (E) can be varied depending on the purpose. In the case of improving impact resistance of the aliphatic polyester, the glass transition point (Tg) measured by DCS is preferably 0° C. or lower, and more preferably −30° C. or lower. In the case of improving heat resistance of the aliphatic polyester, in the case of a polyethylene, the melting point (Tm) measured by DSC is preferably from 70 to 130° C., and in the case of a polypropylene, the melting point (Tm) measured by DSC is preferably from 70 to 180° C., further preferably from 100 to 170° C., and more preferably from 120 to 160° C.

In particular, in the case of using a polypropylene as the olefin polymer (E) for the purpose of improving heat resistance, a polypropylene having high stereo tacticity and a wide molecular weight distribution is preferable. Specifically, a polypropylene having an isotactic pentad fraction (mmmm fraction) measured by $^{13}$C-NMR spectrum of a component (X) insoluble in 23° C. para-xylene of 97% or higher, and a molecular weight distribution represented by Mw/Mn determined by gel permeation chromatography (GPC) of from 6 to 20 is preferable.

Further, it is possible to add conventional plasticizer, tackifier, anti-aging agent, processing assistant, adhesion improver, inorganic filler, inorganic fiber such as glass fiber, organic fiber such as acrylic fiber, PET fiber, PEN fiber, kenaf or plant fiber, organic filler, heat stabilizer, weathering stabilizer, antistatic agent, colorant, lubricant, flame retardant, blooming inhibitor and the like to the polar group-containing polymer composition (F) of the invention in a range that does not impair the object of the invention.

As the various additives, a plasticizer, a tackifier, a processing assistant, an antioxidant, an ultraviolet absorber, a weathering stabilizer, a heat stabilizer, a flame retardant, an internal release agent, an inorganic additive, an antistatic agent, a surface wettability improver, a combustion auxiliary, a pigment, a dye, a nucleating agent, a lubricant, a blooming inhibitor, a natural substance, an inorganic filler, an inorganic fiber such as a glass fiber, an organic fiber such as acrylic fiber, PET fiber, PEN fiber, kenaf or a plant fiber, an organic filler, and the like can be exemplified. Preferably, a plasticizer is exemplified. As the specific plasticizers, triacetin, triethylene glycol diacetate, triethyl acetylcitrate, tributyl acetylcitrate, and dibutyl sebacate are exemplified.

Further, in T die extrusion molding, to improve blocking prevention or slipperiness of the film and sheet, an inorganic additive or a lubricant (aliphatic carboxylic amides) can be added.

As the inorganic additive, silica, mica, talc, glass fibers, glass beads, kaolin, kaolinite, barium sulfate, calcium sulfate, magnesium hydroxide, wollastonite, carbon fibers, calcium silicate fibers, magnesium oxysulfate fibers, potassium titanate fibers, calcium sulfite, white carbon, clay, montmorillonite, titanium oxide, zinc oxide, and the like are exemplified, and in particular, mica, talc, glass fibers, carbon fibers, and calcium carbonate are preferable. Those can be used alone or as mixtures of two or more. In particular, by using the glass fibers as the inorganic additive, improvement in heat resistance of the resin composition can be expected. As the organic additive, starch and its derivatives, cellulose and its derivatives, pulp and its derivatives, paper and its derivatives, wheat flour, bean curd refuse, bran, coconut shell, coffee grounds, protein, phthalic acid series, aliphatic polybasic acid series, glycerin series, citric acid series, glycol series and olefin series low molecular weight material as a plasticizer; polyethylene terephthalate fibers, polyethylene naphthalate fibers, and aramid fibers as organic fibers; and the like are exemplified. In particular, by using a plasticizer, a glass transition point (Tg) of the aliphatic polyester (A) decreases, and as a result, improvement in heat resistance, impact resistance, ductility and the like can be expected. Further, by using an organic fiber, improvement in heat resistance can be expected. Those can be used alone or as mixtures of two or more.

In the resin composition containing from 1 to 30% by weight of the resin modifier (C), from 99 to 20% by weight of the polar group-containing polymer (D) and from 0 to 80% by weight of the olefin polymer (E), it is preferable that the addition amount of those additives is from 0.1 to 30% by weight depending on use and in a range that does not impair the object of the invention.

(Use Application)

The resin modifier (C) of the invention is designed to have the polyolefin main chain, while having reactivity to various polar group-containing polymers (D), and is therefore useful as a reactive compatibilizer between the polar group-containing polymer (D) and the olefin polymer (E). The polar group-containing polymer composition (F) obtained is greatly improved in impact resistance, particularly impact resistance at low temperature. Further, in the case of conducting molding such as injection molding using the polar group-containing polymer composition (F), it becomes possible to obtain a molded article having smooth surface, without that the surface of a molded article has burrs or becomes rough. The molded article obtained from the polar group-containing polymer composition (F) of the invention is not particularly limited, and can be utilized in various applications such as automobile parts, appliance material parts, electric and electronic parts, building components, civil engineering members, agricultural materials, commodities, various films, gas permeable films or sheets, foamed products suitable in general industry uses and recreation uses, yarns, textiles, medical or sanitary materials, and the like. Preferably, it can be utilized in automobile material parts, appliance material parts, and electric and electronic parts, requiring heat resistance and impact resistance. Specifically, development into parts conventionally using resin parts, such as front doors and wheel caps, in the automobile part material use; development into package parts of products such as personal computers, headphone stereo and mobile phones, in gas tank and appliance material part uses; development into refractive material films and sheets and polarizing films and sheets in the electric and electronic parts; containers, pallets, piles and the like in civil engineering members; and the like are exemplified.

Further, in the case of conducting molding such as injection molding using the polar group-containing polymer composition (F), since the resin modifier (C) is present, the surface of the molded article is not roughened, and it becomes possible to obtain a molded article having a smooth surface. Further, where the proportion of polylactic acid is large, a molded article derived from a plant is obtained. This gathers attention as an environment-responsive material, and is preferable.

The molded article obtained from the polar group-containing polymer composition (F) of the invention is not particularly limited, and can form, for example, various molded articles such as automobile interior materials, appliance product packages and the like. Thus, it can be used suitably.

The polar group-containing polymer composition (F) exhibits the following properties depending on the combination of resins.

Test method of each property is according to the following method.

a) Izod impact resistance test (According to ASTM D-256. Under 23° C. atmosphere)

b) Tensile elongation test (According to ASTM D-638. Under 23° C. atmosphere. Tensile speed 10 mm/min, and chuck distance 64 mm).

c) HDT heat resistance test (According to ASTM D-648. Load 4.6 kg/cm$^2$).

In the case of a combination of a polylactic acid and a polypropylene resin, it is generally 50 J/m or higher in Izod impact resistance test, 10% or higher in the tensile elongation test, and 40° C. or higher in HDT.

In the case of a combination of a polylactic acid, a polypropylene resin and an elastomer resin or a combination of a polylactic acid and an elastomer resin, it is generally 60 J/m or higher in Izod impact resistance test, 20% or higher in the tensile elongation test, and 40° C. or higher in HDT.

In those combinations, it is preferably from 60 to 300 J/m in Izod impact resistance test, from 50 to 300% in the tensile elongation test, and from 50 to 150° C. in HDT.

EXAMPLE

The present invention is further specifically described below by referring to the Examples and Comparative Examples, but the invention is not limited to those Examples so far as it is not beyond its gist.

Materials Used in Examples and Comparative Examples:

The materials used in Examples and Comparative Examples are shown below.

Melt flow rate (MFR) was measured under the conditions of 190° C. and load 2.16 kg according to ASTM D1238, and under the conditions of 230° C. and load 2.16 kg for a polypropylene and a styrene-butadiene-butylene-styrene polymer (SEBS). Number average molecular weight (Mn) was measured by a gel permeation chromatography (GPC). In an ethylene series polyolefin, the number average molecular weight was determined in terms of a polyethylene conversion where the comonomer amount is 10 mol % or lower, and in terms of an ethylene propylene conversion (ethylene content 70 mol % is the standard) where the comonomer amount exceeds 10 mol %. In a maleic acid-modified polypropylene (A-5) available as the commercial product, it was determined in terms of a polypropylene conversion.

EB-1: Ethylene-butene-1 copolymer (ethylene content: 83.0 mol %, density: 0.864 g/cm$^3$, MFR: 4 g/10 min, Mn: 30,000)

EB-2: Ethylene-butene-1 copolymer (ethylene content: 83.0 mol %, density: 0.864 g/cm$^3$, MFR: 35 g/10 min, Mn: 60,000)

EB-3: Blend of EB-1 and EB-2 in 1:1 weight ratio

EB-4: Ethylene-butene-1 copolymer (ethylene content: 81.0 mol %, density: 0.861 g/cm$^3$, MFR: 0.5 g/10 min)

PO-1: Linear low density polyethylene (ethylene content: 98.0 mol %, density: 0.925 g/cm$^3$, MFR: 2 g/10 min)

PO-2: Ethylene-octene-1 copolymer (ethylene content: 84.0 mol %, density: 0.865 g/cm$^3$, MFR: 13 g/10 min)

PO-3: Linear low density polyethylene (ethylene content: 97.5 mol %, density: 0.920 g/cm$^3$, MFR: 2 g/10 min)

PO-4: Linear low density polyethylene (ethylene content: 94.0 mol %, density: 0.903 g/cm$^3$, MFR: 4 g/10 min)

PP-1: Polypropylene (Block PP) (trade name: J736A, a product of Mitsui Chemicals, Inc., MFR: 25 g/10 min)

PP-2: Polypropylene (Homo PP) (trade name: B101, a product of Mitsui Chemicals, Inc., MFR: 0.7 g/10 min)

SEBS: Styrene-butadiene-butylene-styrene polymer (trade name: H1062, a product of Asahi Kasei Chemicals Corporation, St 18 wt %, MFR: 4.5 g/10 min)

Talc: Talc (trade name: XE71, a product of Nippon Talc Co.)

Carbodiimide group-containing compound (B): Polycarbodiimide (a product of Nisshinbo Industries, Inc., HMV-8CA (trade name: CARBODILITE))

PET: Polyethylene terephthalate resin (intrinsic viscosity [η]: 0.658 dl/g, density: 1.377 g/cm$^3$)

Waste PET: Waste polyethylene terephthalate resin (a product of Yono Pet Bottle Recycle Co., trade name: Regenerated PET Flake)

PLA: Polylactic acid (a product of Mitsui Chemicals, Inc., trade name: LACEA-H100, MFR: 8 g/10 min)

(Various Measurements and Evaluation Methods)

In the Examples and the like, measurement and evaluation were conducted according to the following methods.

<Number Average Molecular Weight>

In the case of conducting maleation of the polyolefin (a-1), measurement of number average molecular weight (Mn) of the polyolefin (a-1) was conducted by gel permeation chromatography (GPC). The number average molecular weight was determined in terms of a polyethylene conversion where the comonomer amount is 10 mol % or lower, and in terms of an ethylene propylene conversion (ethylene content: 70 mol % as the standard) where exceeding 10 mol %.

Further, molar ratio calculation of maleic acid (a-2) mole number/polyolefin (a-1) molecular chain mole number was conducted using the number average molecular weight obtained. The smaller this value, the more difficult to crosslink by extrusion modification, torque is low and it is easy to produce.

<Charging Amount and Charging Ratio>

Employing HMV-8CA (trade name: CARBODILITE), a product of Nisshinbo Industries, Ltd., as the carbodiimide group-containing compound (B), and making the carbodiimide equivalent be 278 g, the following calculation was conducted.

i) Carbodiimide group-containing compound (B)/maleic acid (molar ratio)

ii) Charged polar group content to polyolefin (a-1)
Carbodiimide group/resin (mmol/polyolefin (A) 100 g)

iii) Polar group content contained in resin modifier (C)
Carbodiimide group/resin (mmol/resin modifier (C) 100 i) Carbodiimide group-containing compound (B)/maleic acid (molar ratio)

ii) Charged polar group content to polyolefin (a-1)
Carbodiimide group/resin (mmol/polyolefin (A) 100 g)

iii) Polar group content contained in resin modifier (C)
Carbodiimide group/resin (mmol/resin modifier (C) 100 g)

<Melt Flow Rate (MFR)>

Measurement was conducted according to ASTM D1238-65T

Regarding MFR of the resin modifier (C), it was measured under the conditions of 190° C. and 2.16 Kg load <Impact Resistance Test>

The polar group-containing polymer composition (F) was injection molded, and it was measured according to ASTM-D256. Test temperatures were 23° C., −10° C., and −40° C. In the result that NB (non break) and B (break) were mixed, the average value was employed as the measurement value. NB shows the state that after the test, a test piece did not break into two pieces, and B shows the state that after the test, the test piece broken into two pieces.

The molding temperature, mold condition and molding machine were as follows depending on the resin used.

In PET alloys of Examples 1 and 4 to 8 and Comparative Examples 1, 3, 5 and 6, they were 270° C., 120° C. and 40 seconds, respectively.

Injection molding machine used (PS20E5ASE, a product of Nissei Plastic Industrial Co., Ltd.)

In waste PET alloys of Example 2 and Comparative Example 2, they were 270° C., 40° C. and 20 seconds, respectively.

Injection molding machine used (IS55EPN, a product of Toshiba Machine Co., Ltd.)

In PLA alloys of Example 3 and Comparative Example 4, they were 200° C., 40° C. and 20 seconds, respectively.

Injection molding machine used (IS55EPN, a product of Toshiba Machine Co., Ltd.)

<Evaluation of Injection Molded Article Surface>

The surface of an impact resistance test piece according to ASTM-D256 of an injection molded article was visually observed, and the evaluation was made as follows.

Case that surface is smooth and burr is not visually observed: ○

Case that burr is observed: x

<Production of Polyolefin (A-1) Having a Group which Reacts with a Carbodiimide Group>

0.25 part by weight of maleic anhydride (abbreviated as MAH) and 0.015 part by weight of 2,5-dimethyl-2,5-bis(tert-butylperoxy)hexyne-3 (trade name: PERHEXYNE 25B, a product of NFO Corporation) as a peroxide were mixed with a 1:1 blend pellets (hereinafter abbreviated as EB-3) of 50 parts by weight of an ethylene-butene-1 copolymer (ethylene content: 83.0 mol %, density: 0.864 g/cm$^3$, MFR (190° C., 2.16 Kg load): 3.6 g/10 min, Mn: 30,000, hereinafter abbreviated as EB-1) and 50 parts by weight of an ethylene-butene-1 copolymer (ethylene content: 83.0 mol %, density: 0.864 g/cm$^3$, MFR (190° C., 2.16 Kg load): 35 g/10 min, Mn: 60,000, hereinafter abbreviated as EB-2), and graft modification was conducted using a 30 mm diameter twin screw extruder set to a cylinder temperature of 250° C. By this, a polyolefin (A-1) having a group which reacts with a carbodiimide group, wherein the charged weight ratio of maleic acid and polyolefin chain is 0.25, was obtained.

<Production of Polyolefins (A-2) to (A-4) Having a Group which Reacts with a Carbodiimide Group>

Polyolefins (A-2) to (A-4) having a group which reacts with a carbodiimide group were produced in the same manner as in (A-1), except for changing the kind of the polyolefin used and the amount of maleic acid used. Formulation for producing the resin modifier (C) is shown in Table 1.

<Production of Resin Modifier (C-1)>

To 100 parts by weight of (A-1) obtained, 6.54 parts by weight of the carbodiimide group-containing compound (B) (a polycarbodiimide manufactured by Nisshinbo Industries, Inc., trade name: CARBODILITE HMV-8CA) (In the case of calculating as the molecular weight being 2,500, mole number of polycarbodiimide chain:mole number of malice anhydride in A-1 (MPO-1 (maleic acid-modified polyolefin))=1:1) were melt kneaded in a 30 mm diameter twin screw extruder set to a cylinder temperature of 250° C. to obtain a resin modifier (C-1) having a carbodiimide group content of 30 mmol/100 g.

The resin modifier (C-1) obtained was pale yellow semi-transparent pallets, and MFR (190° C., 2.16 kg load) was 1.1 g/10 min. From that maleic acid peak by IR analysis disappeared, rate of reaction was 100%. Formulation for producing the resin modifier (C) is shown in Table 1.

<Production of Resin Modifiers (C-2) to (C-6)>

The resin modifiers (C) were produced in the same manner as in the above (C-1).

<Production of Resin Modifier (C-7)>

A maleic acid-modified polypropylene (A-5) (Mn: 30,000, intrinsic viscosity [η]: 0.8 dl/g, MAH 1.1 wt %) (hereinafter, a polypropylene before modification with maleic acid is abbreviated as (PP-O), and a polypropylene modified with maleic acid is abbreviated as (A-5)) was got as the polyolefin (A) having a group which reacts with a carbodiimide group.

100 parts by weight of this (A-5) and 8.8 parts by weight of the carbodiimide group-containing compound (B) (a polycarbodiimide manufactured by Nisshinbo Industries, Inc., trade name: CARBODILITE HMV-8CA) were melt kneaded in a 30 mm diameter twin screw extruder set to a cylinder temperature of 250° C. to obtain a resin modifier (C-7) having a carbodiimide group content of 26 mmol/100 g.

The resin modifier (C-7) obtained was pale yellow pellets, and MFR (230° C., 2.16 kg load) was 8 g/10 min. From that maleic acid peak by IR analysis disappeared ⅓, the rate of reaction of maleic acid is 33%. The formulation for producing the resin modifier (C) is shown in Table 1.

<Production of Resin Modifier (C-8)>

To 75 parts by weight of (A-5), 25 parts by weight of a propylene polymer (homo PP manufactured by Mitsui Chemicals, Inc., trade name: B101, 230° C. MFR, 2.16 kg load: 0.7 g/10 min, intrinsic viscosity [η]: 3.2 dl/g, hereinafter abbreviated as PP-2), and 6.6 parts by weight of CARBODILITE HMV-8CA were melt kneaded in a 30 mm diameter twin-screw extruder set to a cylinder temperature of 250° C. to obtain a resin modifier (C-8) having a carbodiimide group content of 20 mmol/100 g.

The resin modifier (C-8) obtained was pale yellow pellets, and MFR (230° C., 2.16 kg load) was 8.5 g/10 min. From that maleic acid peak by IR analysis disappeared ⅓, the rate of reaction of maleic acid is 33%.

The formulation for producing the resin modifier (C) is shown in Table 1.

The resin modifier (C-8) is the degree of dilution with a propylene polymer of 0%, and the resin modifier (C-7) is the degree of dilution with a propylene polymer of 25%. Thus, those are the production method of the resin modifier, wherein the degree of dilution differs. Where the degree of dilution is large, the resin modifier concentration decreases, and further the propylene polymer decreases its molecular weight due to thermal history at the time of production of the resin modifier. Therefore, the impact resistance effect as the polar group-containing polymer composition (F) tends to deteriorate. Further, in the production of the resin modifier using a maleic acid-modified polypropylene as a raw material, when maleic acid is present in large amount, rather than small amount, in the resin modifier molecule after production, a resin modifier having high polarity is obtained, and such is preferable as the resin modifier for the polar group-containing polymer (D) and the olefin polymer (E).

<Production of Resin Modifiers (C9 to C10)>

In preparing the resin modifier (C), without passing through the stage of producing the polyolefin (A) having a group which reacts with a carbodiimide group, a polyolefin, an unsaturated carboxylic acid and the carbodiimide group-containing compound (B) were reacted en bloc in the formulation shown in Table 2 to produce the resin modifier (C). It was melt kneaded with a twin screw extruder in the same manner as in Example 1, and the cylinder temperature was set to 250° C.

The resin modifier (C) obtained by en bloc reaction was brown colored pellets.

Example 1

To 20 parts by weight of the resin modifier (C-1), 60% by weight of a polyethylene terephthalate resin (intrinsic viscosity [η]: 0.658 dl/g, density: 1.377 g/cc, hereinafter abbreviated as PET) as the polar group-containing polymer (D), and 20% by weight of an ethylene-1-butene copolymer (ethylene content: 81.0 mol %, density: 0.861 g/cm$^3$, MFR (190° C., 2.16 Kg load): 0.5 g/10 min, hereinafter abbreviated as EB-4) were melt kneaded with a 30 mm diameter twin-screw extruder having a cylinder temperature set to 280° C. to prepare pellets of the polar group-containing polymer composition (F). The polar group-containing polymer composition (F) obtained was injection molded at 280° C., and impact resistance at ordinary temperature and low temperature (23° C. and −40° C.) was measured with IZOD piece.

From that the resin modifier (C-1) obtained above has the main chain skeleton of the polyolefin polymer while having the reactivity with the polar group-containing polymer, it functions as a reactive compatibilizer (reactive compatibilizer for polyester/polyolefin alloy) between EB-4 and PET, and could be obtained as a composition having considerably good impact resistance even at low temperature of −40° C. The formulation of the polar group-containing polymer composition (F) and the measurement results are shown in Table 3.

Examples 2 to 8

The polar group-containing polymer composition (F) was produced in the same manner as in Example 1 above.
The measurement results are shown in Table 3.

Example 9

To 5 parts by weight of the resin modifier (C-7), 50% by weight of a polylactic acid (LACEA H100, a product of Mitsui Chemicals, Inc., 190° C. MFR, 2.16 kg load: 8 g/10 min, hereinafter abbreviated as PLA) as the polar group-containing polymer (D), 50% by weight of a polypropylene (block PP manufactured by Mitsui Chemicals, Inc., trade name: J736A, 230° C. MFR, 2.16 kg load: 25 g/10 min, hereinafter referred to as PP-1) as the polyolefin polymer (E), 10% by weight of a styrene-butadiene-butylene-styrene polymer (a product of Asahi Kasei Chemicals, Co., trade name: H1062, St 18 wt %, 230° C. MFR, 2.16 kg load: 4.5 g/10 min, hereinafter referred to as SEBS), and 10% by weight of talc (a product of Nippon Talc Co., trade name: XE71) were melt kneaded with a 30 mm diameter twin screw extruder having a cylinder temperature set to 200° C. to produce pellets of the polar group-containing polymer composition (F). The polar group-containing polymer composition (F) obtained was injection molded at 210° C., and impact resistance at ordinary temperature (23° C.) with IZOD piece and resin modifier (0.45 MPa, ¼ inch-thick test piece) by HDT were measured.

From that the resin modifier (C-7) obtained above has the main chain skeleton of the polyolefin polymer while having the reactivity with the polar group-containing polymer, it functions as a reactive resin modifier (reactive resin modifier for polyester/polyolefin alloy) between PP and PLA, and it could be obtained as a composition having good impact resistance.

Further, not only impact resistance, HDT heat resistance was 87° C., and it was improved than none resin modifier (Comparative Example 8) (58° C.), and was good.

Formulation of the polar group-containing polymer composition (F) and measurement results are shown in Table 3.

Example 10

The polar group-containing polymer composition (F) was produced in the same manner as in Example 9 above.

From that the resin modifier (C-8) obtained above has the main chain skeleton of the polyolefin polymer while having the reactivity with the polar group-containing polymer, it functions as a reactive compatibilizer (reactive compatibilizer for polyester/polyolefin alloy) between PP and PLA, and it could be obtained as a composition having good impact resistance. Further, not only impact resistance, HDT heat resistance (0.45 MPa, ¼ inch thick test piece) was 78° C., and it was improved than none resin modifier (Comparative Example 8) (58° C.), and was good.

As a result of observing the cut piece with an optical microscope, PLA constituted an island phase, and PP constituted a sea phase. A size of the island phase was about 5 μm or smaller.

Formulation of the polar group-containing polymer composition (F) and measurement results are shown in Table 3.

Comparative Examples 1 to 2

Using the resin modifiers (C-9 to C-10) obtained, the polar group-containing polymer composition (F) was produced in the same manner as in Example 1, except for changing the kind and blending ratio of the polar group-containing polymer (D) and the olefin polymer (E) as shown in Table 4. Measurement result of impact resistant strength of the polar group-containing polymer composition (F) is shown in Table 4.

From that in the case of obtaining the resin modifier (C) by en bloc reaction, it does not have the skeleton of a polyolefin having a group which reacts with the polar group-containing polymer. Therefore, impact resistant strength, particularly impact strength at low temperature, of a polymer alloy when made as the polar group-containing polymer composition (F) was poor.

Comparative Examples 3 to 4

Using (A-1) which is (A) having a group which reacts with a carbodiimide group obtained in Example 1, and without producing the resin modifier (C-1), the polar group-containing polymer composition (F) was produced in the same manner as in Example 1, except for changing the kind and blending ratio of the polyolefin (A-1) having a group which reacts with a carbodiimide group, the carbodiimide group-containing compound (B), the polar group-containing polymer (D) and the olefin polymer (E) as shown in Table 4. Measurement result of impact resistant strength of the polar group-containing polymer composition (F) obtained is shown in Table 4.

Since the resin modifier (C) was not produced, it did not have the skeleton of a polyolefin having a group which reacts with the polar group-containing polymer. Therefore, impact resistant strength, particularly impact strength at low temperature, of a polymer alloy when made as the polar group-containing polymer composition (F) was poor.

Comparative Example 5

It was attempted to produce the polar group-containing polymer composition (F) by melt mixing en bloc a polyolefin, an unsaturated carboxylic acid, the carbodiimide group-containing compound (B), the polar group-containing polymer (D), and the olefin polymer (E). The melt kneading temperature was set to 280° C. as same as in Example 1. Blending ratio of each component is shown in Table 4.

In this Comparative Example, the resin modifier (C) was not produced. Therefore, a strand did not have a melt tension, and the polar group-containing polymer composition (F) could not be produced.

Comparative Example 6

The resin modifier (C) was not produced. As shown in Table 2, the kind of the polyolefin used was changed, maleation was not conducted, it was not reacted with a carbodiimide group-containing compound, and a linear low density polyethylene of the above PO-4 was used. The polar group-containing polymer composition (F) was produced in the same manner as in Example 1.

The measurement result is shown in Table 4. It had a composition that carbodiimide content/resin modifier (C) is 0 (mmol/100 g), and due to that compatibility was insufficient in the test piece in injection molding, or burr was observed.

Further, low temperature impact resistant strength of a polymer alloy when made as the polar group-containing polymer composition (F) was poor.

Comparative Example 7

The polar group-containing polymer composition (F) was produced in the same manner as in Example 9, without the resin modifier (C) and changing the kind and blending ratio of the polar group-containing polymer (D) and the olefin polymer (E) as shown in Table 4. Measurement result of impact resistant strength of the polar group-containing polymer composition (F) obtained is shown in Table 4.

Without the resin modifier (C), there was slightly rough feeling on the surface, and impact resistance and HDT heat resistant temperature (0.45 MPa, ¼ inch thick test piece) (58° C.) were poor.

Comparative Example 8

The polar group-containing polymer composition (F) was produced in the same manner as in Example 9, without the resin modifier (C) and changing the kind and blending ratio of the polar group-containing polymer (D) and the olefin polymer (E) as shown in Table 4. Measurement result of impact resistant strength and HDT heat resistant temperature of the polar group-containing polymer composition (F) obtained is shown in Table 4.

Without the resin modifier (C), there was slightly rough feeling on the surface, and impact resistance and HDT heat resistant temperature (0.45 MPa, ¼ inch thick test piece) (58° C.) were poor.

As a result of observing a cut piece with an optical microscope, PLA constituted an island phase, and PP constituted a sea phase. A size of the island phase was about 10 μm or larger.

TABLE 1

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Polyolefin graft polymer Sample name | (A-1) | (A-1) | (A-1) | (A-1) | (A-1) | (A-1) | (A-1) | (A-1) | (A-1) | (A-1) |
| Polyolefin graft polymer (A): (parts by weight) | 100 | 100 | 100 | 100 | 100 | 100 | 100 | 100 | 100 | 100 |
| Polyolefin (a-1) | EB-3 | EB-3 | EB-3 | EB-3 | EB-3 | EB-3 | PO-1 | PO-2 | PP-O | PP-O |
| Number average molecular weight (Mn): ($\times 10^4$) | 4.5 | 4.5 | 4.5 | 4.5 | 4.5 | 4.5 | 2.75 | 4.4 | 3 | 3 |
| Crystallinity of polyolefin: (%) | 0 | 0 | 0 | 0 | 0 | 0 | 50 | 0 | — | — |
| Unsaturated carboxylic acid (a-2) | MAH | MAH | MAH | MAH | MAH | MAH | MAH | MAH | MAH | MAH |
| Modifying amount (wt %) | 0.25 | 0.25 | 0.25 | 0.5 | 0.25 | 0.25 | 0.25 | 0.5 | 1.1 | 1.1 |
| Peroxide (wt %) | 0.015 | 0.015 | 0.015 | 0.03 | 0.015 | 0.015 | 0.03 | 0.03 | — | — |
| Amount of unsaturated carboxylic acid (a-2): (mmol) | 2.25 | 2.25 | 2.25 | 5.10 | 2.25 | 2.25 | 5.10 | 5.10 | 11.22 | 11.22 |
| Mn/(100 * f/M) | 1.15 | 1.15 | 1.15 | 2.30 | 1.15 | 1.15 | 1.40 | 2.24 | 3.37 | 3.37 |
| Carbodiimide group containing compound (B): (parts by weight) | 6.54 | 6.54 | 6.54 | 3.28 | 13 | 26 | 6.54 | 6.54 | 8.8 | 6.6 |
| Sum of amount: (parts by weight) | 106.54 | 106.54 | 106.54 | 103.28 | 113 | 126 | 106.54 | 106.54 | 108.8 | 106.6 |
| (B)/(a-2): mol ratio | 1.10 | 1.10 | 1.10 | 0.3 | 2.0 | 4.1 | 0.5 | 0.5 | 0.314 | 0.314 |
| Content of polar group: (mmol/100 g of (a-1)) | 24 | 24 | 24 | 12 | 47 | 94 | 24 | 24 | 32 | 24 |
| After reaction Sample name of compatibilizer (C) | (C-1) | (C-1) | (C-1) | (C-2) | (C-3) | (C-4) | (C-5) | (C-6) | (C-7) | (C-8) |
| Content of polar group in (C): (mmol/100 g of (a-1)) | 21 | 21 | 21 | 7 | 44 | 91 | 18 | 18 | 28 | 20 |
| Content of carbodiimide group in carbodiimide-based resin modifier (mmol/(100 g of (C)) | 20 | 20 | 20 | 6 | 39 | 72 | 17 | 17 | 26 | 19 |

TABLE 2

|  | Cmparative Example 1 | Cmparative Example 2 | Cmparative Example 3 | Cmparative Example 4 | Cmparative Example 5 | Cmparative Example 6 | Cmparative Example 7 | Cmparative Example 8 |
|---|---|---|---|---|---|---|---|---|
| Production process of carbodiimide-based resin modifier (C) | en bloc reaction | en broc reaction | not produced | not produced | not produced | not produced | not produced | not produced |
| Polyolefin graft polymer (A): (parts by weight) | 100 | 100 | 100 | 100 |  |  |  |  |
| Polyolefin (a-1) | EB-3 | EB-3 | EB-3 | EB-3 |  | PO-3 |  |  |
| Number average molecular weight (Mn): ($\times 10^4$) | 4.5 | 4.5 | 4.5 | 4.5 |  | 2.6 |  |  |
| Crystallinity of polyolefin: (%) | 0 | 0 | 0 | 0 |  |  |  |  |
| Unsaturated carboxylic acid (a-2) | MAH | MAH | MAH | MAH |  |  |  |  |
| Modifying amount (wt %) | 0.25 | 0.25 | 0.25 | 0.25 |  |  |  |  |
| Peroxide (wt %) | 0.015 | 0.015 | 0.015 | 0.15 |  |  |  |  |
| Amount of unsaturated carboxylic acid (a-2): mmol | 2.25 | 2.25 |  |  |  |  |  |  |
| Mn/(100 * f/M) | 1.15 | 1.15 |  |  |  |  |  |  |
| Carbodiimide group containing compound (B): (parts by weight) | 6.54 | 6.54 |  |  |  |  |  |  |
| Sum of amount: (parts by weight) | 106.54 | 106.54 |  |  |  |  |  |  |
| (B)/(a-2): mol ratio | 1.0 | 1.0 |  |  |  |  |  |  |
| Content of polar group: (mmol/100 g of (a-1)) | 24 | 24 |  |  |  |  |  |  |
| After reaction Sample name of compatibilizer (C) | (C-9) | (C-10) | none | none | none | none | none | none |
| Content of polar group in (C): (mmol/100 g of (a-1)) | 21 | 21 |  |  |  |  |  |  |
| Content of carbodiimide group in carbodiimide-based resin modifier (mmol/100 g of (C)) | 20 | 20 |  |  |  |  |  |  |

TABLE 3

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Carbodiimide resin modifier (C): (parts by weight) | 20 | 5 | 5 | 20 | 20 | 20 | 20 | 20 | 5 | 6.5 |
| Polar group containing polymer: (D): (parts by weight) | PET 60 | waste PET 80 | PLA 80 | PET 60 | PET 60 | PET 60 | PET 60 | PET 60 | PLA 50 | PLA 50 |
| Polyolefin polymer (E): (parts by weight) | EB-4 20 | PO-4 15 | EB-4 15 | EB-4 20 | EB-4 20 | EB-4 20 | EB-4 20 | EB-4 20 | PP-1 50 | PP-1 50 |
| Polyolefin polymer (E): (parts by weight) |  |  |  |  |  |  |  |  | SEBS 10 | SEBS 10 |
| Filler:: (parts by weight) |  |  |  |  |  |  |  |  | talc 10 | talc 10 |
| Polar polymer composition (F): (parts by weight) | 100 | 100 | 100 | 100 | 100 | 100 | 100 | 100 | 125 | 125 |
| Polar polymer composition (F): |  |  |  |  |  |  |  |  |  |  |
| 23° C. IZOD property J/m | 752 | 516 | 215 |  | 303 | 381 | 825.00 | 500.00 | 112 | 110 |
| −10° C. IZOD property (J/m) |  | 124 | 94 |  |  |  |  |  |  |  |
| −40° C. IZOD property (J/m) | 410 |  |  | 230 | 706 | 296 | 270 | 250 |  |  |
| Evaluation of injection molded article of polar polymer composition | ○ | ○ | ○ | ○ | ○ | ○ | ○ | ○ | ○ | ○ |

TABLE 4

|  | Cmparative Example 1 | Cmparative Example 2 | Cmparative Example 3 | Cmparative Example 4 | Cmparative Example 5 | Cmparative Example 6 | Cmparative Example 7 | Cmparative Example 8 |
|---|---|---|---|---|---|---|---|---|
| Production process of carbodiimide-based resin modifier (C) | successive reaction | successive reaction | successive reaction | successive reaction | en bloc reaction | en bloc reaction | en bloc reaction | en bloc reaction |
| Polyolefin graft polymer (A): (parts by weight) |  |  | 18.773 | 4.693 |  |  |  |  |

TABLE 4-continued

|  | Cmparative Example 1 | Cmparative Example 2 | Cmparative Example 3 | Cmparative Example 4 | Cmparative Example 5 | Cmparative Example 6 | Cmparative Example 7 | Cmparative Example 8 |
|---|---|---|---|---|---|---|---|---|
| Polyolefin (a-1): (parts by weight) |  |  |  |  | 18.723 | 20 |  |  |
| Unsaturated carboxylic acid (a-2): (parts by weight) |  |  |  |  | 0.047 |  |  |  |
| Peroxide (wt %) weight) |  |  | 1.227 | 0.307 | 0.003 1.227 |  |  |  |
| Polar group containing compound (D): (parts by weight) | PET 60 | waste PET 80 | PET 60 | PLA 80 | PET 60 | PET 60 | PLA 50 | PLA 50 |
| Polyolefin polymer (E): (parts by weight) | EB-4 20 | PO-3 15 | EB-4 20 | EB-4 15 | EB-4 20 | EB-4 20 | PP-2 50 | PP-2 50 |
| Polyolefin polymer (E): (parts by weight) |  |  |  |  |  |  |  | SEBS 10 |
| Filler (parts by weight) |  |  |  |  |  |  |  | talc 10 |
| Polar polymer composition (F): (parts by weight) | 100 | 100 | 100 | 100 | 100 | 100 | 100 | 120 |
| Polar polymer composition (F): |  |  |  |  |  |  |  |  |
| 23° C. IZOD property J/m | 609 | 436 | 698 | 187 | * |  | 15 | 25 |
| −10° C. IZOD property (J/m) |  | 64 |  | 67 | * |  |  |  |
| −40° C. IZOD property (J/m) | 133 |  | 154 |  | * | 20 |  |  |
| Evaluation of injection molded article of polar polymer composition | ○ | ○ | ○ | ○ | ○ | X | X | X |

*Production impossible

INDUSTRIAL APPLICABILITY

According to the invention, by improving compatibility between the polar group-containing polymer and the olefin polymer, low temperature impact resistance in a polymer alloy is improved, and in the case of molding a molded article from the composition, a novel resin modifier that can obtain a smooth surface can be provided.

The polar group-containing polymer composition of the invention can be utilized in various applications such as automobile parts, appliance material parts, electric and electronic parts, building components, civil engineering members, agricultural materials, commodities, various films, gas permeable films or sheets, foamed products suitable in general industry uses and recreation uses, yarns, textiles, medical or sanitary materials, and the like.

Specifically, it is possible to suitably use in development into parts conventionally using resin parts, such as front doors and wheel caps, in the automobile part material use; development into package parts of products such as personal computers, headphone stereo and mobile phones, in gas tank and appliance material part uses; development into refractive material films and sheets and polarizing films and sheets in the electric and electronic parts; and applications to containers, pallets, piles and the like in civil engineering members.

Further, by employing a polylactic acid and a polypropylene as the polar group-containing polymer and olefin polymer, various molded articles of automobile interior materials and appliance packages can be molded, and it is possible to suitably use as an environment-responsive polylactic series polymer alloy molded article.

The invention claimed is:

1. A polar group-containing polymer composition (F) comprising from 1 to 30% by weight of a resin modifier (C) obtained by reacting a mixture consisting essentially of a polyolefin (A) having a group which reacts with a carbodiimide group, and a carbodiimide group-containing compound (B), wherein the content of the carbodiimide group is from 1 to 200 mmol per 100 g of the resin modifier, from 80 to 25% by weight of a polar group-containing polymer (D), and from 5 to 60% by weight of an olefin polymer (E), provided that the sum of (C), (D) and (E) is 100% by weight.

2. The polar group-containing polymer composition (F) according to claim 1, wherein the resin modifier is a reactive compatibilizer.

3. The polar group-containing polymer composition (F) according to claim 1, wherein the polyolefin (A) is a polymer satisfying the following formula (I);

$$0.1 < Mn/(100 * f/M) < 6 \tag{1}$$

wherein f is the molecular weight (g/mol) of the compound having a group which reacts with a carbodiimide group, M is a content (wt %) of residue of the compound having a group which reacts with a carbodiimide group, and Mn is a number average molecular weight of the polyolefin.

4. The polar group-containing polymer composition (F) according to claim 1, wherein the carbodiimide group-containing compound (B) is a polycarbodiimide.

5. The polar group-containing polymer composition (F) according to claim 1, wherein the polyolefin (A) having a group which reacts with a carbodiimide group is the polyolefin (A) having at least one selected from a carboxyl group, an amide group, an amino group and a hydroxyl group.

6. The polar group-containing polymer composition (F) according to claim 1, wherein the polyolefin (A) having a group which reacts with a carbodiimide group is the polyolefin (A) having a maleic group.

7. The polar group-containing polymer composition (F) according to claim 1, wherein the polar group-containing polymer (D) is a polar group-containing polymer containing at least one selected from a carboxyl group, an amide group, an amino group and a hydroxyl group.

8. The polar group-containing polymer composition (F) according to claim 1, wherein the polar group-containing polymer (D) is at least one selected from a polyester, a polyamide, and an ethylene vinyl alcohol polymer.

9. The polar group-containing polymer composition (F) according to claim 1, wherein the polar group-containing polymer (D) is at least one selected from a polyethylene terephthalate, a polyethylene terephthalate for recycling, a polybutylene terephthalate, a polylactic acid, an ethylene vinyl alcohol copolymer, and an aliphatic polyamide.

10. The polar group-containing polymer composition (F) according to claim 1, wherein the polar group-containing polymer (D) is a polylactic acid.

11. The polar group-containing polymer composition (F) according to claim 1, wherein a diameter of an island phase is from 0.1 to 50 μm.

12. A method for producing a resin composition comprising:

a step of kneading and mixing a polyolefin (A) having a group which reacts with a carbodiimide group, and a carbodiimide group-containing compound (B) to obtain a resin modifier (C), wherein the content of the carbodiimide group is from 1 to 200 mmol per 100 g of the resin modifier (C), and further, a step of kneading and mixing from 1 to 30% by weight of said resin modifier (C), from 80 to 25% by weight of a polar group-containing polymer (D) and from 5 to 60% by weight of an olefin polymer (E) (provided that the sum of (C), (D) and (E) is 100% by weight.

\* \* \* \* \*